(12) United States Patent
 Takahashi et al.

(10) Patent No.: US 10,431,924 B2
(45) Date of Patent: Oct. 1, 2019

(54) TERMINAL AND WIRING MODULE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Hideo Takahashi, Mie (JP); Shinichi Takase, Mie (JP); Hiroki Shimoda, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 15/760,689

(22) PCT Filed: Aug. 30, 2016

(86) PCT No.: PCT/JP2016/075282
§ 371 (c)(1),
(2) Date: Mar. 16, 2018

(87) PCT Pub. No.: WO2017/047372
PCT Pub. Date: Mar. 23, 2017

(65) Prior Publication Data
US 2018/0261953 A1    Sep. 13, 2018

(30) Foreign Application Priority Data

Sep. 16, 2015 (JP) ................................. 2015-182747

(51) Int. Cl.
*H01R 13/52* (2006.01)
*H01G 11/10* (2013.01)
(Continued)

(52) U.S. Cl.
CPC .......... *H01R 13/5227* (2013.01); *H01G 2/04* (2013.01); *H01G 11/10* (2013.01); *H01G 11/76* (2013.01);
(Continued)

(58) Field of Classification Search
CPC .... H01R 13/5227; H01R 11/32; H01R 11/12; H01R 11/288; H01R 13/6658;
(Continued)

(56) References Cited

U.S. PATENT DOCUMENTS 7,108,519 B2 * 9/2006 Tomikawa ......... H01R 13/6658
                                                            439/76.2
7,270,552 B2 * 9/2007 Kanou ................... H05K 7/026
                                                            439/474
(Continued)

FOREIGN PATENT DOCUMENTS

| JP | 2008-176970 A | 7/2008 |
| JP | 2011-238430 A | 11/2011 |
| JP | 2014-053183 A | 3/2014 |

OTHER PUBLICATIONS

Search Report for PCT/JP2016/075282, dated Oct. 18, 2016.

*Primary Examiner* — Jean F Duverne
(74) *Attorney, Agent, or Firm* — Honigman LLP

(57) ABSTRACT

A bus bar terminal includes an electrode connection portion that connects electrode terminals of power storage elements to each other, and a wire connection portion that is to be connected to an electrical wire, and guide portions are provided between the electrode connection portion and the wire connection portion, the guide portions guiding adhered liquid so as to fall to a position separated from the wire connection portion.

20 Claims, 22 Drawing Sheets

(51) Int. Cl.
  *H01G 11/76* (2013.01)
  *H01G 2/04* (2006.01)
  *H02G 3/16* (2006.01)
  *H01M 2/20* (2006.01)
  *H01M 2/30* (2006.01)
  *H01M 2/32* (2006.01)
  *H01R 11/12* (2006.01)
  *H02G 3/08* (2006.01)
  *H01R 11/32* (2006.01)
  *H01G 2/10* (2006.01)
  *H01R 11/28* (2006.01)

(52) U.S. Cl.
  CPC ........... *H01M 2/202* (2013.01); *H01M 2/206* (2013.01); *H01M 2/305* (2013.01); *H01M 2/32* (2013.01); *H01R 11/12* (2013.01); *H01R 11/32* (2013.01); *H02G 3/088* (2013.01); *H02G 3/16* (2013.01); *H01G 2/103* (2013.01); *H01M 2220/20* (2013.01); *H01R 11/288* (2013.01)

(58) Field of Classification Search
  CPC ........ H01M 2/202; H01M 2/32; H01M 2/305; H01M 2/206; H01G 2/103; H01G 11/76; H01G 2/04; H01G 11/10; H02G 3/16; H05K 7/026
  USPC ......................................................... 439/522
  See application file for complete search history.

(56) References Cited

U.S. PATENT DOCUMENTS

| | | |
|---|---|---|
| 2003/0219998 A1 | 11/2003 | Kakuta et al. |
| 2004/0011319 A1* | 1/2004 | Rotter ...................... F01M 1/06 |
| | | 123/196 R |
| 2006/0292903 A1 | 12/2006 | Kanou |
| 2018/0279675 A1* | 10/2018 | Liu .......................... A24F 47/00 |

* cited by examiner

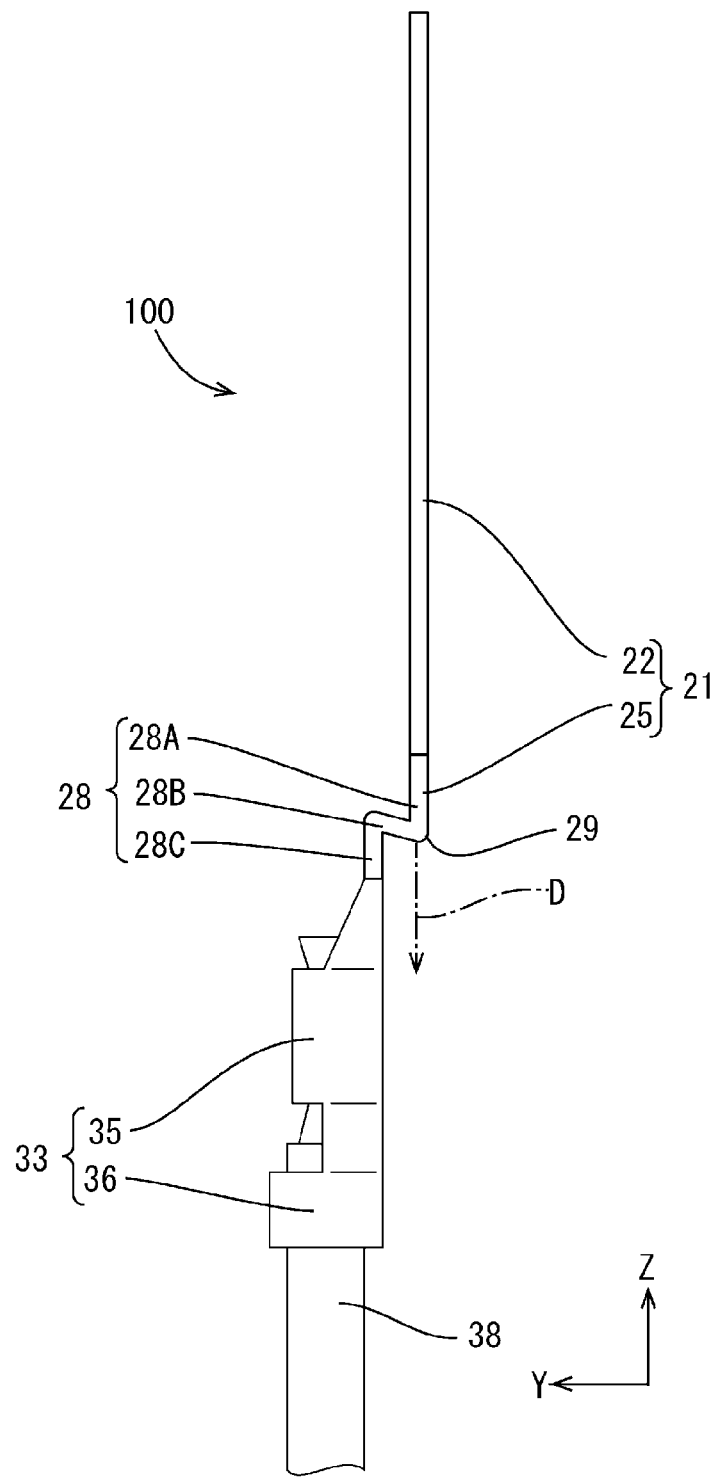

TERMINAL AND WIRING MODULE

This application is the U.S. national stage of PCT/JP2016/075282 filed Aug. 30, 2016, which claims priority of Japanese Patent Application No. JP 2015-182747 filed Sep. 16, 2015.

TECHNICAL FIELD

The present specification relates to technology regarding terminals.

BACKGROUND

In a power storage module for a vehicle such as an electric automobile or a hybrid vehicle, multiple power storage elements that have electrode terminals are arranged side-by-side, and the power storage elements are connected in series by using bus bars to connect the electrode terminals of adjacent power storage elements to each other. Here, in order to simplify the bus bar attachment operation, there are cases where a wiring module that houses multiple bus bars is attached to the power storage elements.

With this type of wiring module, a voltage detection terminal for detecting the voltage of the power storage elements is placed on a bus bar (see JP 2000-333343A). This voltage detection terminal is connected to a core wire that is exposed from an insulating covering at one end portion of an electrical wire, and the other end portion of the electrical wire is drawn to the outside of the power storage module and connected to an ECU (Electronic Control Unit) or the like.

Incidentally, there are cases where a liquid such as a water drop adheres to a bus bar for connecting electrode terminals. When the temperature of the bus bar decreases while the vehicle is stopped for example, there are cases where condensation forms on the bus bar. There is concern that a problem will occur if the liquid such as the water drop that adheres to the bus bar in this way reaches the electrical wire that is connected to the voltage detection terminal.

The present invention was achieved in light of the above-described situation, and an object of the present invention is to suppress a problem caused by the adhering of the liquid to the electrical wire.

SUMMARY

A terminal of the present invention includes: a connection portion that is to be connected to an electrode terminal of a power storage element; and a wire connection portion that is to be connected to an electrical wire, wherein a guide portion is provided between the connection portion and the wire connection portion, the guide portion guiding a liquid adhered to the connection portion so as to fall to a position separated from the wire connection portion.

According to this configuration, the liquid adhered to the terminal is guided by the guide portion so as to fall to a position separated from the wire connection portion, thus making it possible to suppress a problem caused by the adhering of the liquid to an electrical wire.

The following aspects are preferable as aspects for carrying out the present invention.

The connection portion is provided in a plate-shaped portion made of a plate-shaped metal member, and the guide portion is provided at an end portion on a wire connection portion side of the plate-shaped portion.

The guide portion is formed as a cutout in an edge of the plate-shaped portion.

According to this configuration, there is no need to perform bending processing for forming the guide portion, thus making it possible to simplify the manufacturing process.

The guide portion extends in a direction that intersects a plate surface of the plate-shaped portion.

According to this configuration, the liquid can be guided to a position separated from the plane of the plate-shaped portion.

The guide portion joins the connection portion and the wire connection portion with a bent shape having a return portion.

According to this configuration, it is possible to simplify the configuration of the guide portion.

The connection portion connects a plurality of the electrode terminals to each other.

A wiring module includes: the above-described terminal; and an insulating protector that houses the terminal, wherein the insulating protector includes a bottom plate portion that opposes a plate surface of the terminal, and a partition wall that rises from the bottom plate portion and partitions off the terminal, and a discharge hole is formed in at least one of the bottom plate portion and the partition wall, the liquid that was guided by the guide portion and fell being discharged to the outside by the discharge hole.

According to this configuration, the liquid can be discharged from the discharge hole to the outside.

Advantageous Effects of Invention

According to the present invention, it is possible to suppress a problem caused by the adhering of a liquid to an electrical wire.

BRIEF DESCRIPTION OF DRAWINGS

FIG. 22 is a side view of the bus bar terminal connected to the end portion of the electrical wire.

DETAILED DESCRIPTION OF PREFERRED EMBODIMENTS

First Embodiment

A first embodiment will be described below with reference to FIGS. 1 to 11.

A wiring module 10 of the present embodiment is for attachment to a power storage module. The power storage module is installed in a vehicle such as an electric automobile or a hybrid automobile, and is used as a power source. In the following description, the X direction is the rightward direction, the Y direction is the forward direction, and the Z direction is the upward direction.

The power storage module includes multiple power storage elements BC (see FIG. 18) that are arranged side-by-side in a horizontal line, and the wiring module 10 is attached to front faces (side faces) of the power storage elements BC. Each power storage element BC has a main body portion that is shaped as a flattened cuboid and houses a power storage element, and includes a bolt-shaped electrode terminal BP that projects from a seat portion PE provided at an end portion of the main body portion. Using a nut (not shown) and the electrode terminal BP as fastening members, a bus bar terminal 20 (one example of a "terminal") is sandwiched between and fastened by the nut and the seat portion PE. Multiple power storage elements BC are connected in series by arranging electrode terminals BP with opposite polarities so as to be adjacent to each other. An electrode terminal BP located at an end of the series connection is connected to a device such as an external inverter via an electrical wire (not shown).

Wiring Module 10

Figure 1:
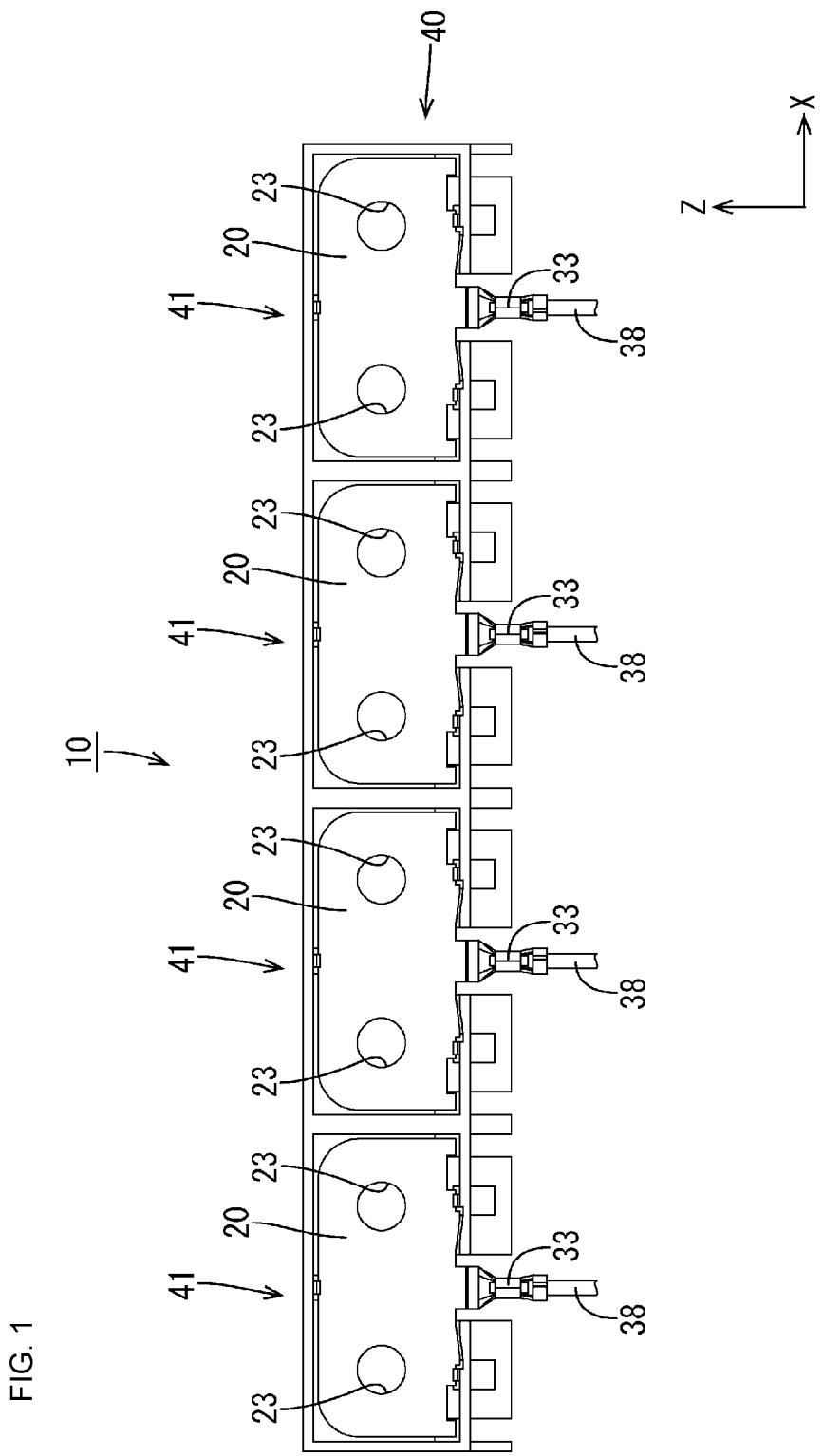
FIG. 1 is a front view of a wiring module of a first embodiment.

As shown in FIG. 1, the wiring module 10 is constituted included multiple bus bar terminals 20 and an insulating protector 40 that houses the bus bar terminals 20.

Bus Bar Terminal 20

Figure 5:
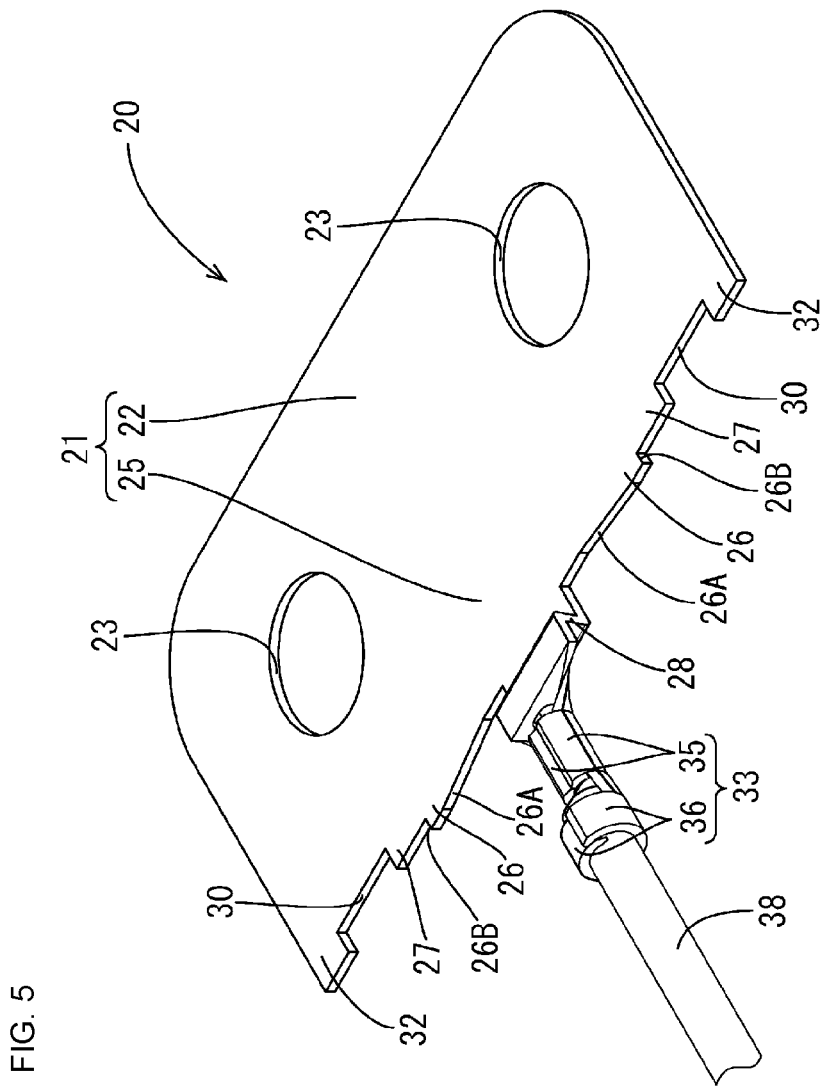
FIG. 5 is a perspective view of a bus bar terminal connected to an end portion of an electrical wire.
Figure 6:
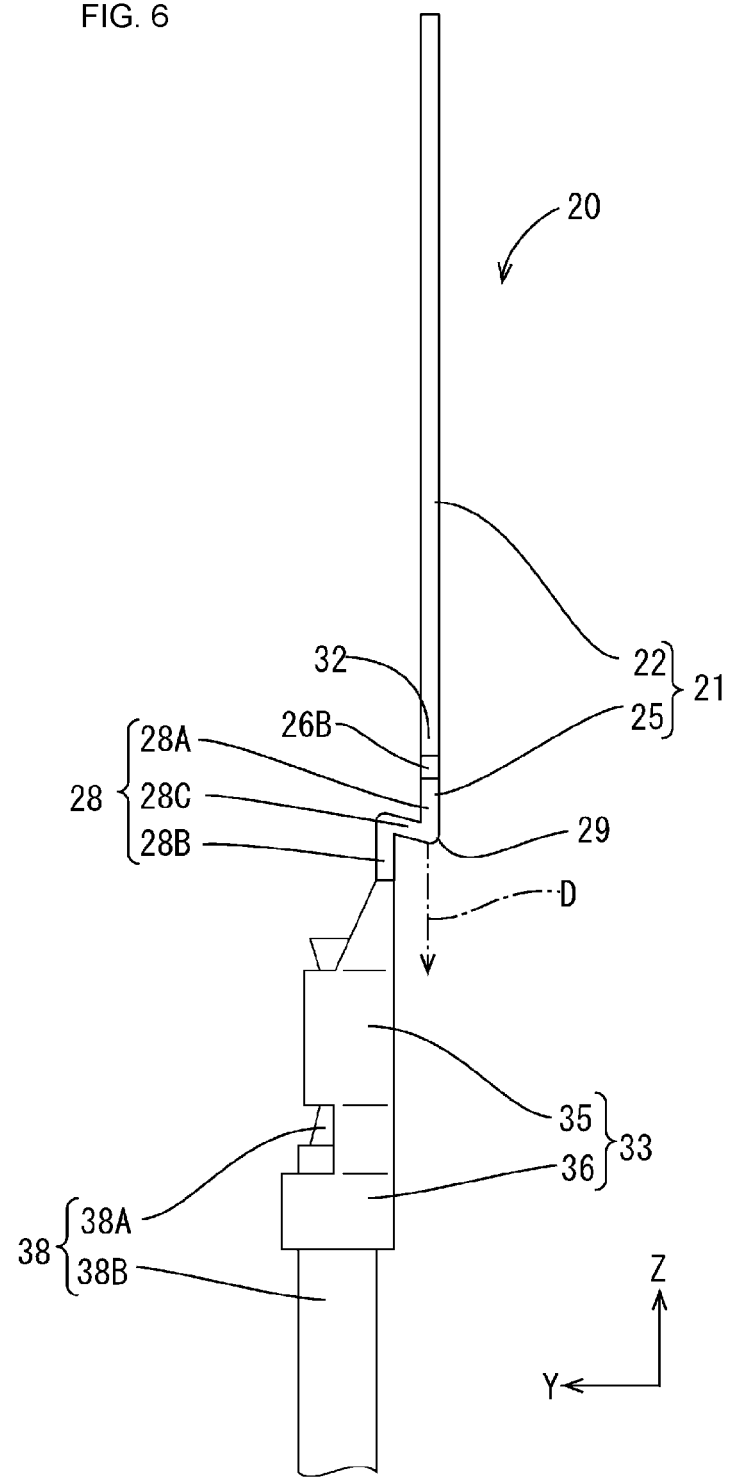
FIG. 6 is a side view of the bus bar terminal connected to the end portion of the electrical wire.

Each bus bar terminal 20 is formed from a metal such as copper, a copper alloy, aluminum, an aluminum alloy, or stainless steel (SUS), and as shown in FIGS. 5 and 6, includes a plate-shaped portion 21 that is plate-shaped, and a wire connection portion 33 that is formed as a single piece with the plate-shaped portion 21 and is for connection to an end portion of an electrical wire 38.

The plate-shaped portion 21 includes an electrode connection portion 22 (one example of a "connection portion") that has an approximately rectangular shape and connects adjacent electrode terminals BP to each other, and a joining portion 25 that joins the electrode connection portion 22 and the wire connection portion 33. Pairs of left and right first guide portions 26 (one example of a "guide portion"), locked portions 27, recessed portions 30, and projecting pieces 32 are provided side-by-side in the left-right direction in the lower end portion of the plate-shaped portion 21.

The first guide portions 26 extend laterally from respective sides of the wire connection portion 33, and each include an inclined portion 26A in which the projecting dimension increases (the lower end becomes lower) in an inclined manner toward the outer side, and a step portion 26B that is continuous with the locked portion 27 in a step-like manner. The locked portions 27 are provided between the first guide portions 26 and the recessed portions 30, and when the locked portions 27 are locked to withdrawal restriction pieces 47 of an insulating protector 40, withdrawal of the bus bar terminal 20 toward the front side is restricted. The recessed portions 30 are formed as rectangular cutouts in the lower end portion of the plate-shaped portion 21. The projecting pieces 32 are respectively provided on the left and right end portions, and project with a constant width.

A pair of left and right through-holes 23 for insertion of the electrode terminals BP are formed in the electrode connection portion 22. The wire connection portion 33 has a pair of wire barrel portions 35 that rise up from a bottom plate on which the electrical wire 38 is placed, and a pair of insulation barrel portions 36 that are integrally continuous with the pair of wire barrel portions 35. The wire barrel portions 35 crimp a conductor portion 38A that is exposed from the electrical wire 38 by removing an insulation covering 38B thereof. The insulation barrel portions 36 hold the electrical wire 38 from above the insulation covering 38B. The wire barrel portions 35 and the insulation barrel portions 36 extend forward from the bottom plate and are wrapped around the electrical wire 38, and the electrical wire 38 is arranged at a position separated in the forward direction relative to the plane of the electrode connection portion 22.

The electrical wire 38 that is connected to the wire connection portion 33 is connected to an external ECU (Engine Control Unit) that is not shown. The ECU is provided with a microcomputer, elements, and the like, and has a known configuration including functions for detecting the voltage, current, temperature, and the like of the power storage elements BC, performing charge/discharge control of the power storage elements BC, and the like.

The joining portion 25 is provided with a second guide portion 28 (one example of a "guide portion") that extends with a Z shape. As shown in FIG. 6, the second guide portion 28 includes a bus bar-side extension portion 28A that extends coplanar with and downward from an intermediate portion of the lower end of the electrode connection portion 22, a wire-side extension portion 28B that extends coplanarly from the bottom plate of the connection portion 33 on which the electrical wire 38 is placed, and an inclined joining portion 28C (one example of a "return portion") that joins the bus bar-side extension portion 28A and the wire-side extension portion 28B in an inclined manner. The wire-side extension portion 28B is continuous with the wire barrel portions 35. In accordance with the angle of the inclined joining portion 28C relative to the electrode connection portion 22 (the bus bar-side extension portion 28A) and the length of the inclined joining portion 28C, the electrical wire 38 is arranged at a position separated in the forward direction relative to the plane of the electrode connection portion 22. When a liquid D reaches an edge portion 29 where the inclined joining portion 28C and the bus bar-side extension portion 28A are joined at an acute angle, the liquid D falls downward from the edge portion 29.

At this time, the wire connection portion 33 and the electrical wire 38 are separated from the plane of the electrode connection portion 22, and therefore the liquid D does not come into contact with the wire connection portion 33 or the electrical wire 38.

Insulating Protector 40

Figure 2:
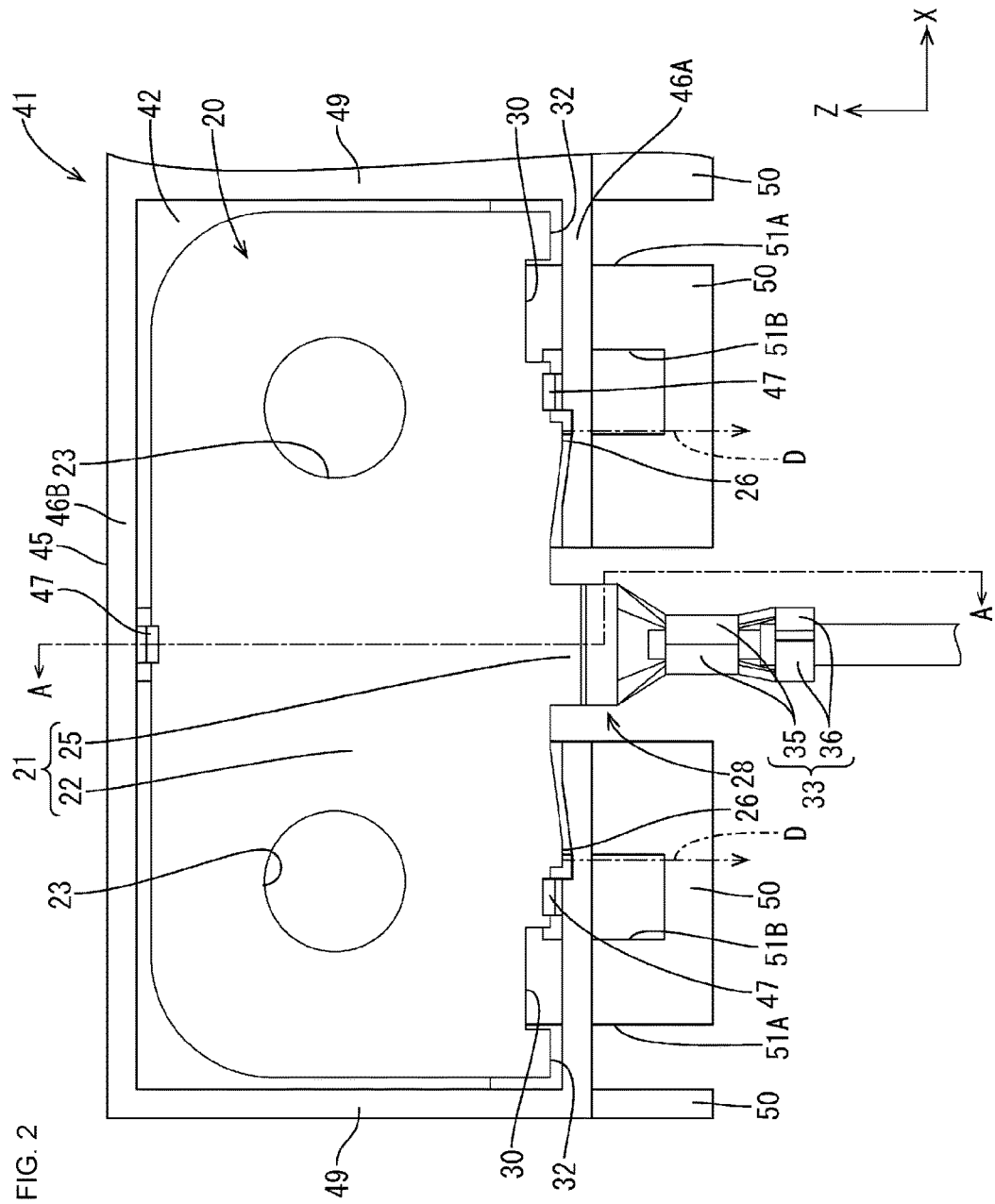
FIG. 2 is a front view of a partial enlargement of the wiring module.
Figure 3:
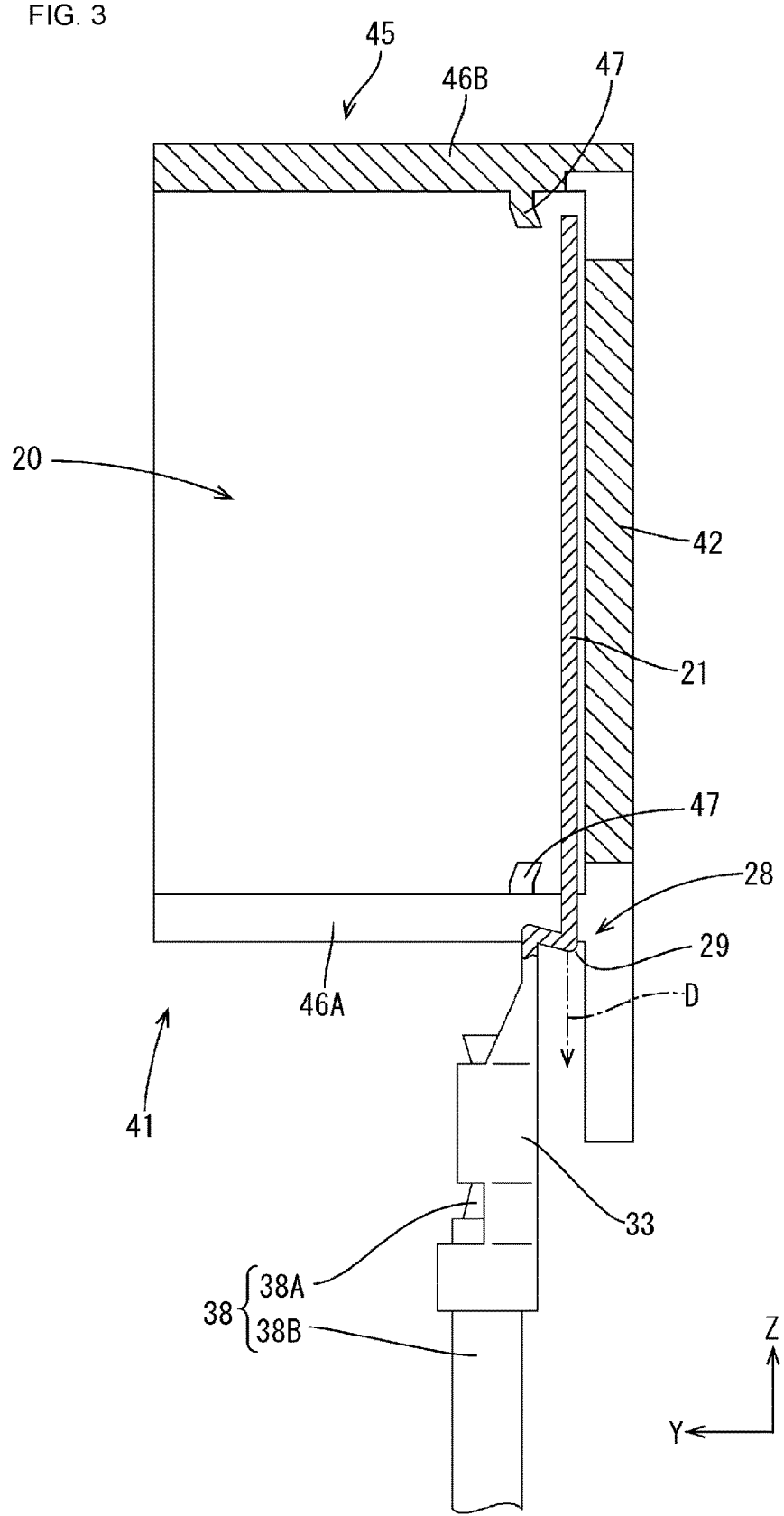
FIG. 3 is a cross-sectional view taken along A-A in FIG. 2.
Figure 4:
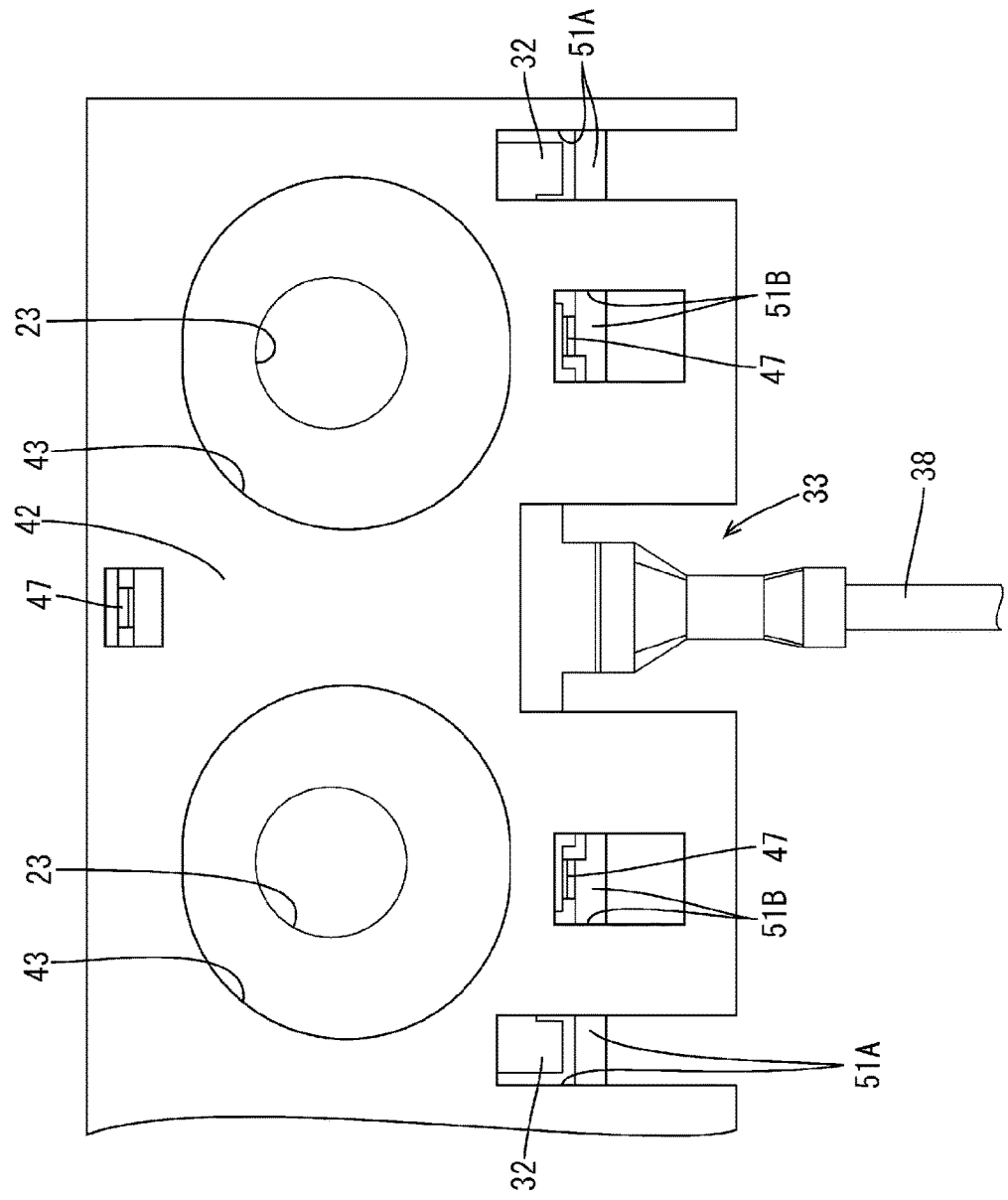
FIG. 4 is a bottom view of a partial enlargement of the wiring module.

The insulating protector 40 is made of an insulating synthetic resin, and as shown in FIG. 1, includes multiple housing portions 41 that house the bus bar terminals 20. As shown in FIGS. 2 and 3, the housing portions 41 each include a bottom plate portion 42 on which a plate-shaped portion 21 can be placed such that one face (the face on the power storage element BC side) of the plate-shaped portion 21 faces the bottom plate portion 42, and a partition wall 45 that surrounds the plate-shaped portion 21 in a rectangular tube shape. As shown in FIG. 4, a pair of left and right circular opening portions 43 for passage of the electrode terminals BP are formed in the bottom plate portion 42.

As shown in FIG. 2, the partition wall 45 includes a pair of opposing wall portions 46A and 46B that extend along the arrangement direction of the power storage elements BC, and a pair of joining wall portions 49 that join the pair of opposing wall portions 46A and 46B. The opposing wall portions 46A and 46B include multiple withdrawal restriction pieces 47 that restrict withdrawal of the bus bar terminals 20 from the front face side (the side opposite to the power storage element BC). The withdrawal restriction pieces 47 project inward from inward faces of the pair of opposing wall portions 46A and 46B of the partition wall 45, and are formed with a shape extending in a cantilevered manner and capable of bending deformation by forming cutouts in the bottom plate portion 42 and the partition wall 45. When the withdrawal restriction pieces 47 are bent, and the plate-shaped portion 21 is arranged on the bottom plate portion 42, the withdrawal restriction pieces 47 then undergo restoring deformation, and withdrawal of the bus bar terminal 20 is restricted. Multiple plate-shaped extension portions 50, which are continuous in the same plane as the bottom plate portion 42, extend outward from the partition wall 45.

Multiple discharge holes 51A and 51B that discharge the liquid D (e.g., water) are formed in the housing portion 41 by providing cutouts in the bottom plate portion 42, the opposing wall portions 46A and 46B, and the extension portions 50. The discharge holes 51A and 51B form cuboid spaces. The outward discharge holes 51A are formed so as to extend along the joining wall portion 49. The discharge holes 51B are formed with a larger width and smaller length than the discharge holes 51A. As shown in FIG. 2, when the liquid D adhered to the electrode connection portion 22 moves to the first guide portions 26 on the lower side, the liquid D then moves diagonally downward along the guide portions 26, and upon reaching the step portion 26B, falls downward and is discharged to the outside through the discharge holes 51B. Also, as shown in FIG. 3, when the liquid D adhered to the electrode connection portion 22 moves to the second guide portion 28 on the lower side, the liquid D then falls downward from the edge portion 29.

The wiring module 10 is formed by housing a bus bar terminal 20 in each of the housing portions 41 (FIG. 1). The wiring module 10 is then attached to multiple power storage elements BC, and nuts are fastened to the electrode terminals BP, thus forming the power storage module. When this power storage module is installed in a vehicle, the wiring module 10 is arranged with the wire connection portion 33 facing downward (the Z direction is the upward direction).

Actions and effects described below are achieved by the present embodiment.

According to the present embodiment, the liquid D adhered to the electrode connection portion 22 of the bus bar terminal 20 is guided by the guide portions 26 and 28 and falls to a position separated from the wire connection portion 33, thus making it possible to suppress a problem caused by the adhering of the liquid D to the electrical wire.

Also, the electrode connection portion 22 is provided in the plate-shaped portion 21 that is made of a plate-shaped metal member, and the guide portions 26 and 28 are provided in the lower end portion (the end portion on the wire connection portion 33 side) of the plate-shaped portion 21.

According to this configuration, the liquid D can be caused to fall more efficiently than with a configuration in which the guide portions 26 and 28 are provided in a portion other than the lower end portion in the up-down direction.

Also, the first guide portions 26 (guide portions) are formed as cutouts in an edge of the plate-shaped portion 21.

According to this configuration, there is no need to perform bending processing for forming the guide portions 26.

Also, the second guide portion 28 (guide portion) joins the electrode connection portion 22 and the wire connection portion 33 with a bent shape having the inclined joining portion 28C (return portion).

According to this configuration, the guide portion 28 can be formed with a simple configuration.

Also, the insulating protector 40 of the wiring module 10 includes a bottom plate portion 42 that opposes a plate surface of the bus bar terminal 20, and a partition wall 45 that rises upward from the bottom plate portion 42 and partitions off the bus bar terminal, and the discharge holes 51B are formed in at least one of the bottom plate portion 42 and the partition wall 45, the liquid D that was guided by the guide portions 26 and fell downward being discharged to the outside by the discharge holes 51B.

According to this configuration, the liquid D can be discharged from the discharge holes 51B to the outside.

Second Embodiment

A second embodiment will be described below with reference to FIGS. 7 to 10.

In a bus bar terminal 60 of the second embodiment, the first guide portions 26 of the first embodiment are not provided, and a first guide portion 61 that extends in an inclined direction (a direction that intersects the plate surface of the plate-shaped portion 62) is provided. In the following, configurations that are the same as in the first embodiment are denoted by the same reference signs, thus omitting redundant descriptions.

Figure 7:
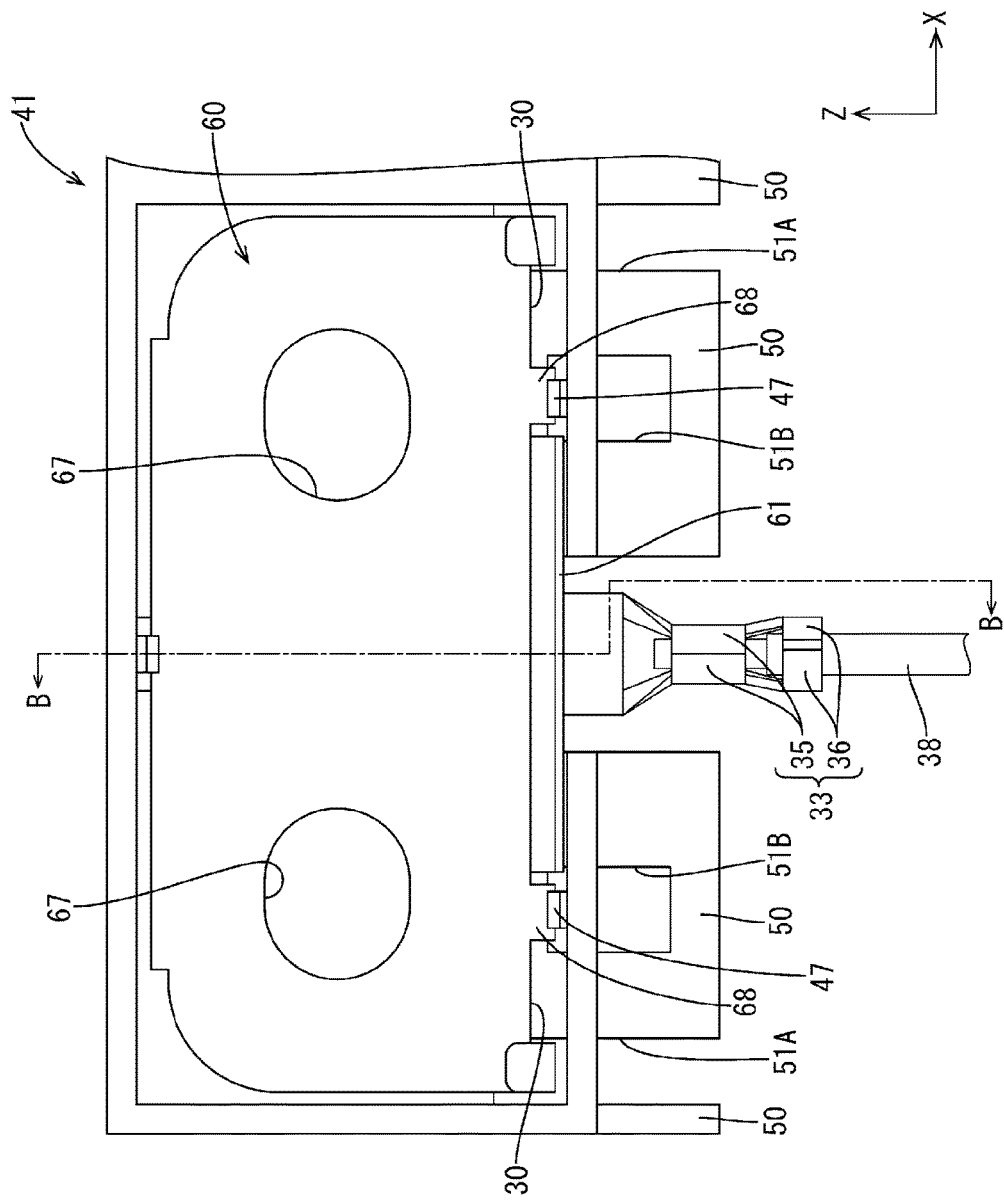
FIG. 7 is a front view of a partial enlargement of a wiring module of a second embodiment.
Figure 10:
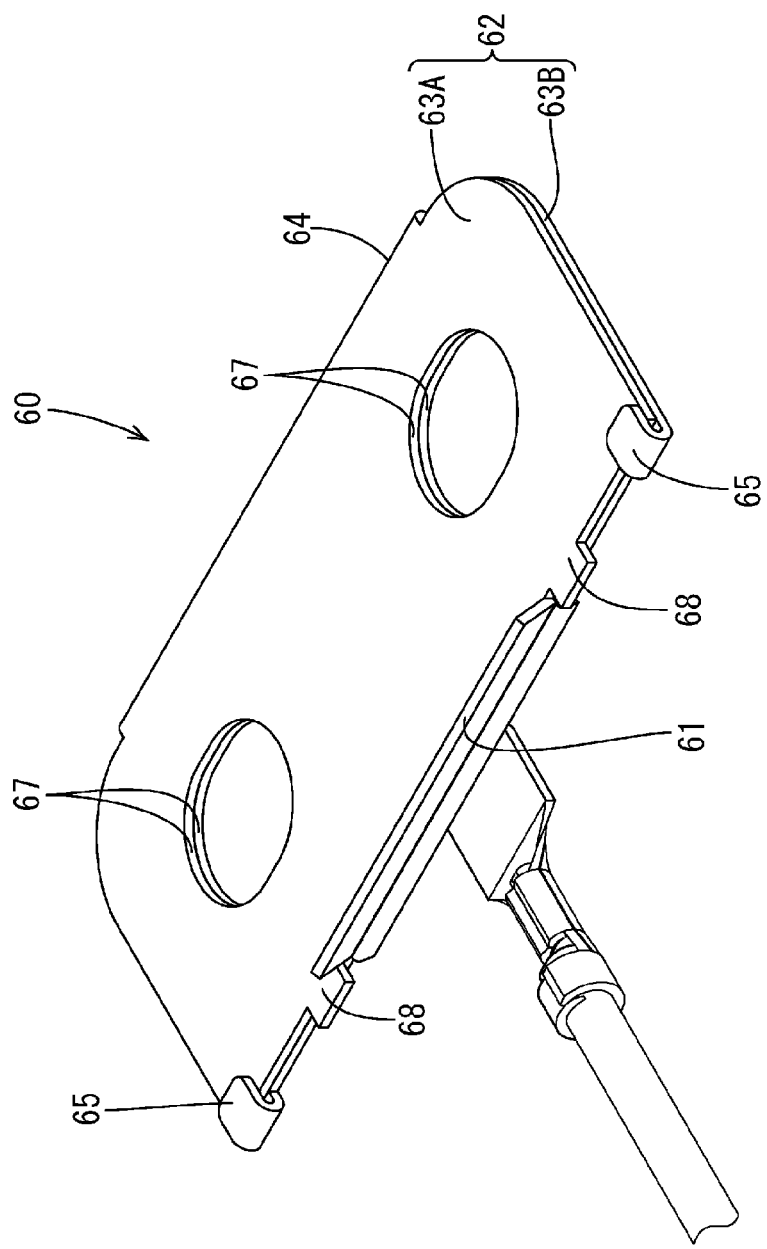
FIG. 10 is a perspective view of a bus bar terminal connected to an end portion of an electrical wire.

As shown in FIG. 7, through-holes 67 of a plate-shaped portion 62 of the bus bar terminal 60 have an elliptical shape elongated in the left-right direction (electrode terminal BP connection direction), and the electrode terminals BP can be inserted through the through-holes 67 with a predetermined clearance in the left-right direction. As shown in FIG. 10, the plate-shaped portion 62 is formed by stacking a pair of thin flat plate portions 63A and 63B that are shaped as flat plates, and the flat plate portions 63A and 63B are connected by a hinge portion 64. Note that the flat plate portions 63A and 63B are made thin because the wire connection portion 33 is formed as a single piece therewith, thus having a thickness that enables easy bending for crimping. Two flat plate portions 63A and 63B are stacked in order to reduce electrical resistance by increasing the thickness of the plate-shaped portion 62. A pair of holding pieces 65 are provided in corner portions of the flat plate portion 63B, and the flat plate portions 63A and 63B are held in the stacked state by bending the holding pieces 65 so as to be locked to the flat plate portion 63A.

The first guide portion 61 is formed at the lower edge of the one flat plate portion 63A (the flat plate portion on the front face side). The first guide portion 61 extends in an inclined direction from a plate surface of the flat plate portion 63A (the plate surface of the plate-shaped portion 62). The angle of the first guide portion 61 relative to the plate surface of the flat plate portion 63A and the length from the lower end of the flat plate portion 63A are set to an angle and a length according to which the liquid D falling from the lower end of the first guide portion 61 does not come into contact with the wire connection portion 33 or the electrical wire 38.

Third guide portions 68 (one example of a "guide portion") that are locked to the withdrawal restriction pieces 47 project from positions adjacent to the first guide portion 61. The third guide portions 68 are shaped as rectangular plates. The bus bar terminal 60 is obtained by using a pressing machine to perform punching processing on a metal plate member so as to obtain a spread-out shape in which the pair of flat plate portions 63A and 63B are connected by the hinge portion 64, and the first guide portion 61 is formed at this time. The hinge portion 64 is then bent, the pair of flat plate portions 63A and 63B are stacked, and the holding pieces 65 are bent and locked to the flat plate portion 63A, thus forming the bus bar terminal 60.

Figure 8:
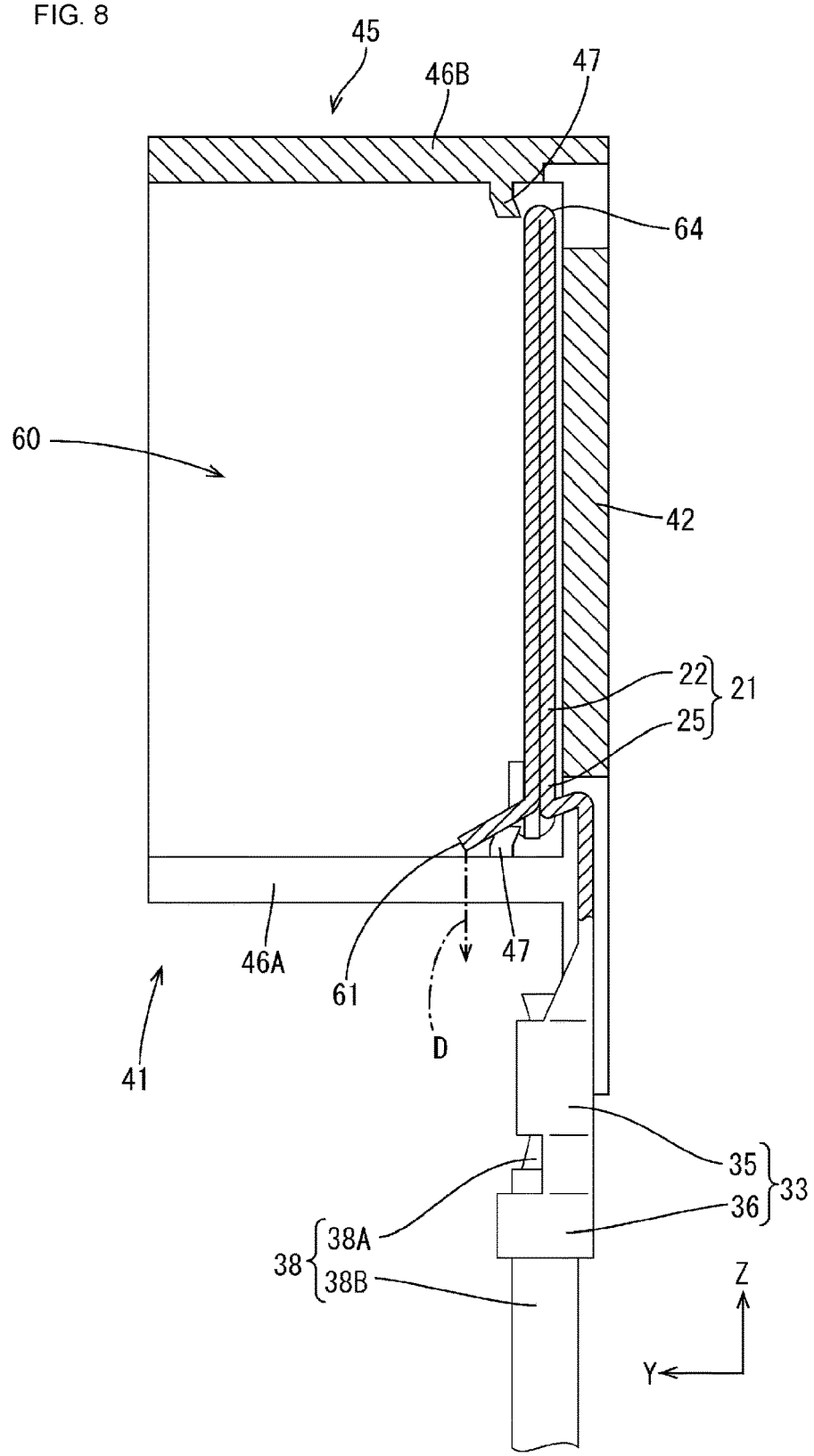
FIG. 8 is a cross-sectional view taken along B-B in FIG. 7.
Figure 9:
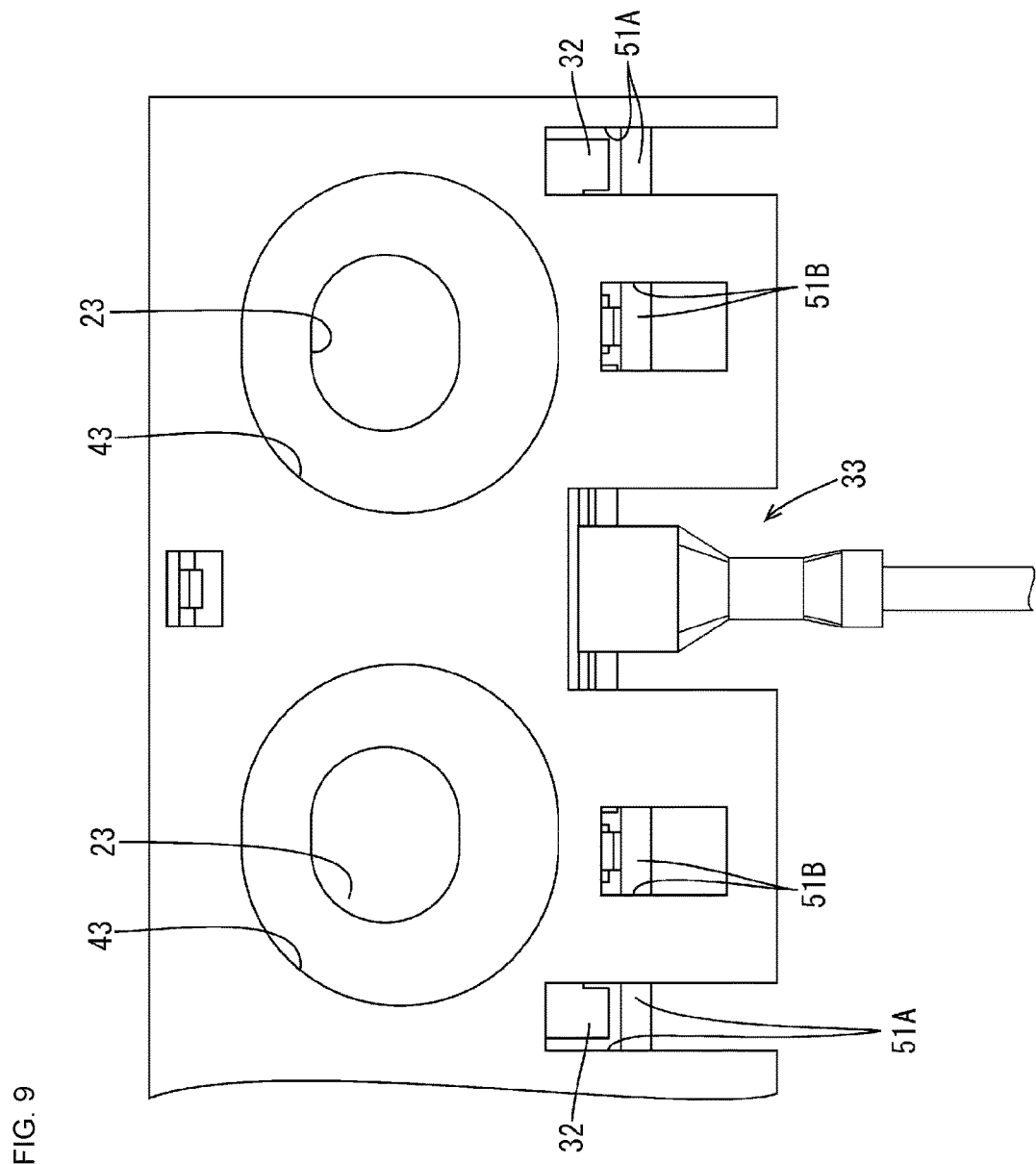
FIG. 9 is a bottom view of a partial enlargement of the wiring module.

As shown in FIG. 8, the liquid D adhered to the electrode connection portion 22 moves to the first guide portion 61 on the lower side and the leading end portions of the third guide portions 68 and falls downward, and does not come into contact with the wire connection portion 33 or the electrical wire 38.

According to the second embodiment, the first guide portion 61 extends in a direction that intersects the plate surface of the plate-shaped portion 62.

According to this configuration, it is possible to guide the liquid D to a plane that is different from the plane of the plate-shaped portion 62 so as to not come into contact with the electrical wire 38.

Third Embodiment

A third embodiment will be described below with reference to FIGS. 11 to 13.

In a bus bar terminal 70 of the third embodiment, the second guide portion 28 is not provided, and first guide portions 71 are provided. Configurations that are the same as in the above embodiments are denoted by the same reference signs, thus omitting redundant descriptions.

Figure 13:
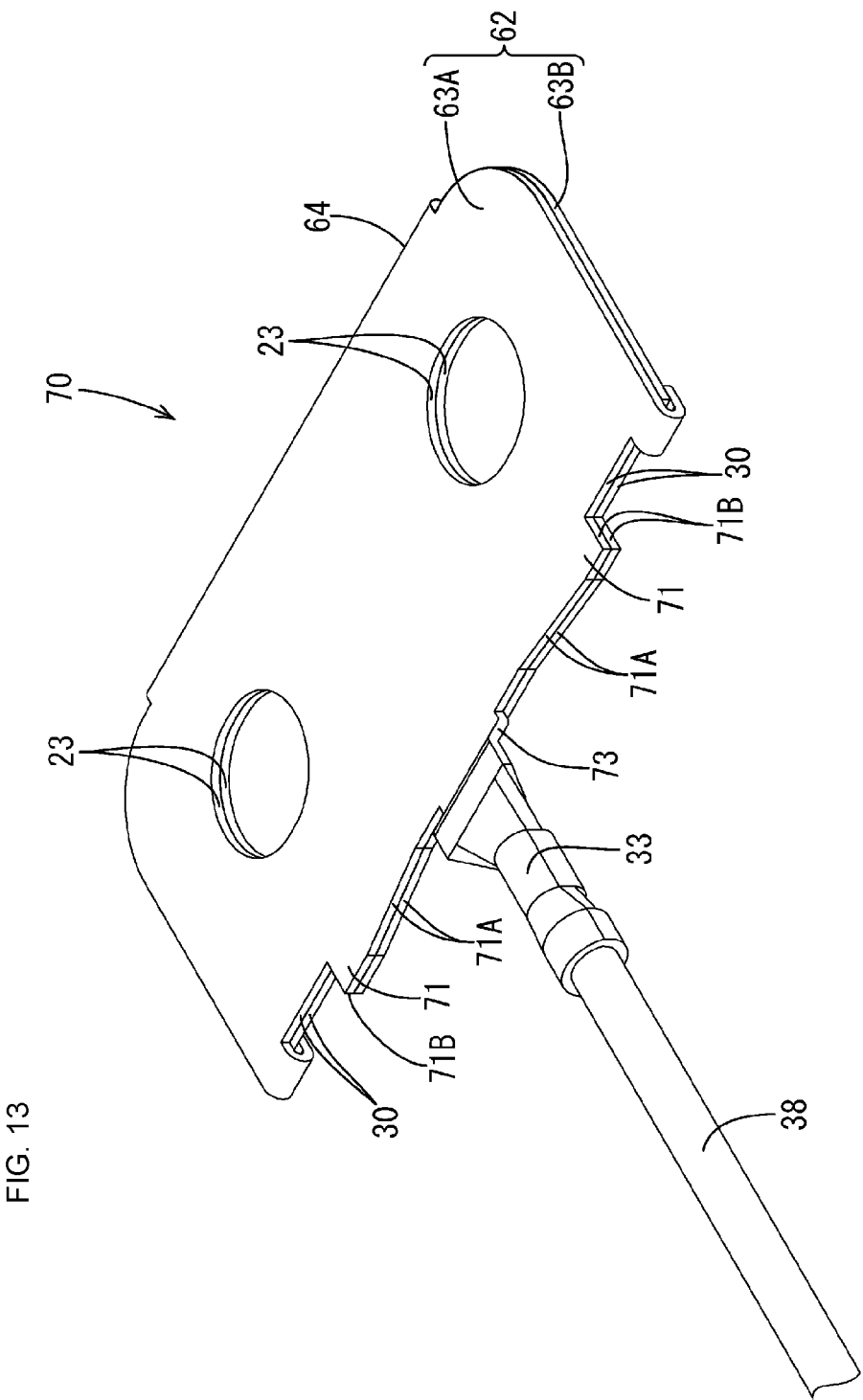
FIG. 13 is a perspective view of a bus bar terminal connected to an end portion of an electrical wire.

As shown in FIG. 13, the plate-shaped portion 62 is connected to the bottom plate of the wire connection portion 33 by a joining portion 73. The joining portion 73 extends in a direction inclined relative to a plate surface of the plate-shaped portion 62. The first guide portions 71 each include an inclined portion 71A and a step portion 71B. The first guide portions 71 also function as locked portions that are locked to the withdrawal restriction pieces 47 so as to restrict withdrawal of the bus bar terminal 70.

Figure 11:
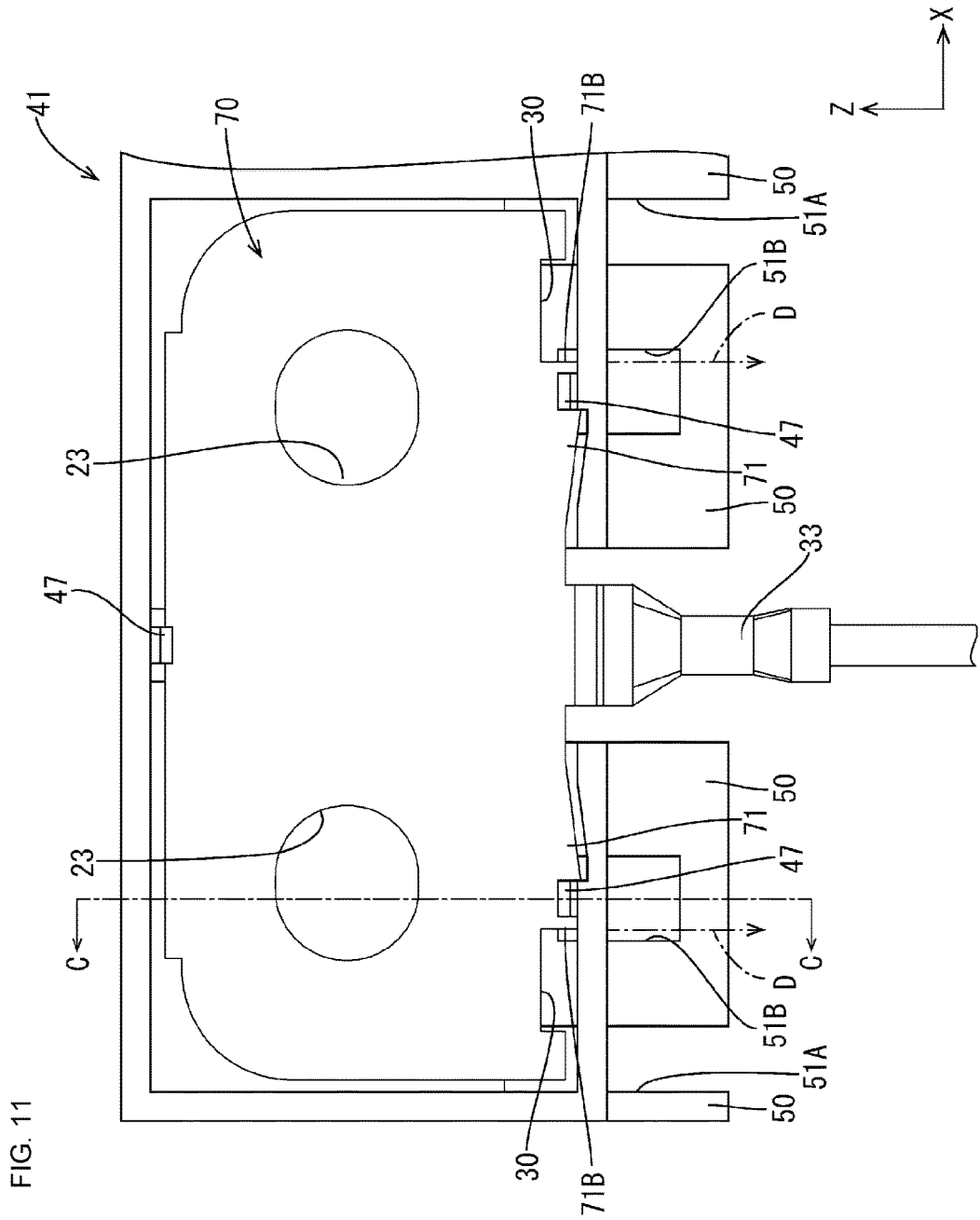
FIG. 11 is a front view of a partial enlargement of a wiring module of a third embodiment.
Figure 12:
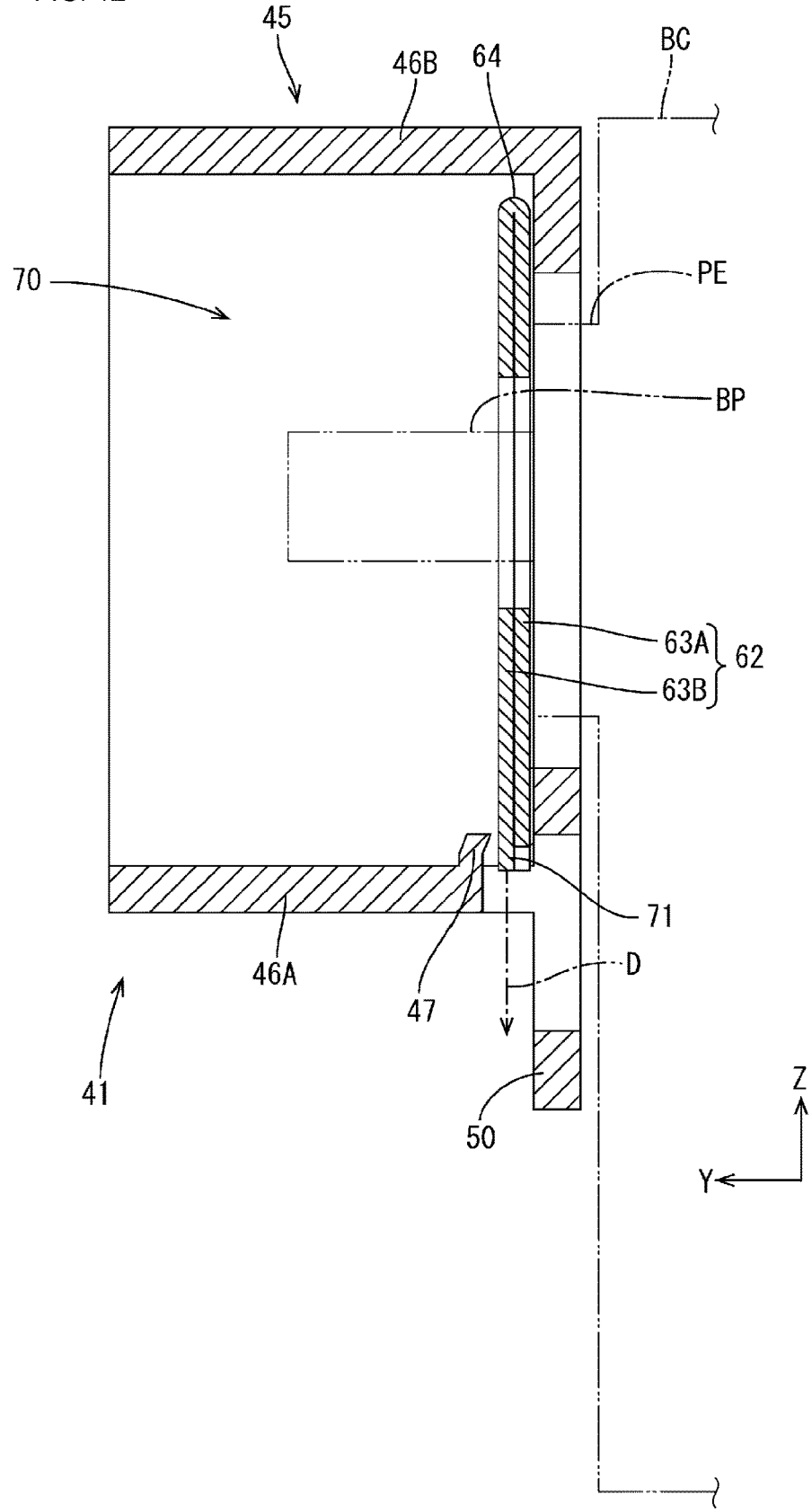
FIG. 12 is a cross-sectional view taken along C-C in FIG. 11.

As shown in FIGS. 11 and 12, when the liquid D adhered to the electrode connection portion 22 moves to the first guide portions 71 on the lower side, the liquid D then moves diagonally downward along the lower edges of the first guide portions 71, and upon reaching the positions of the step portions 71B, falls downward and is discharged to the outside through the discharge holes 51B.

Fourth Embodiment

Figure 14:
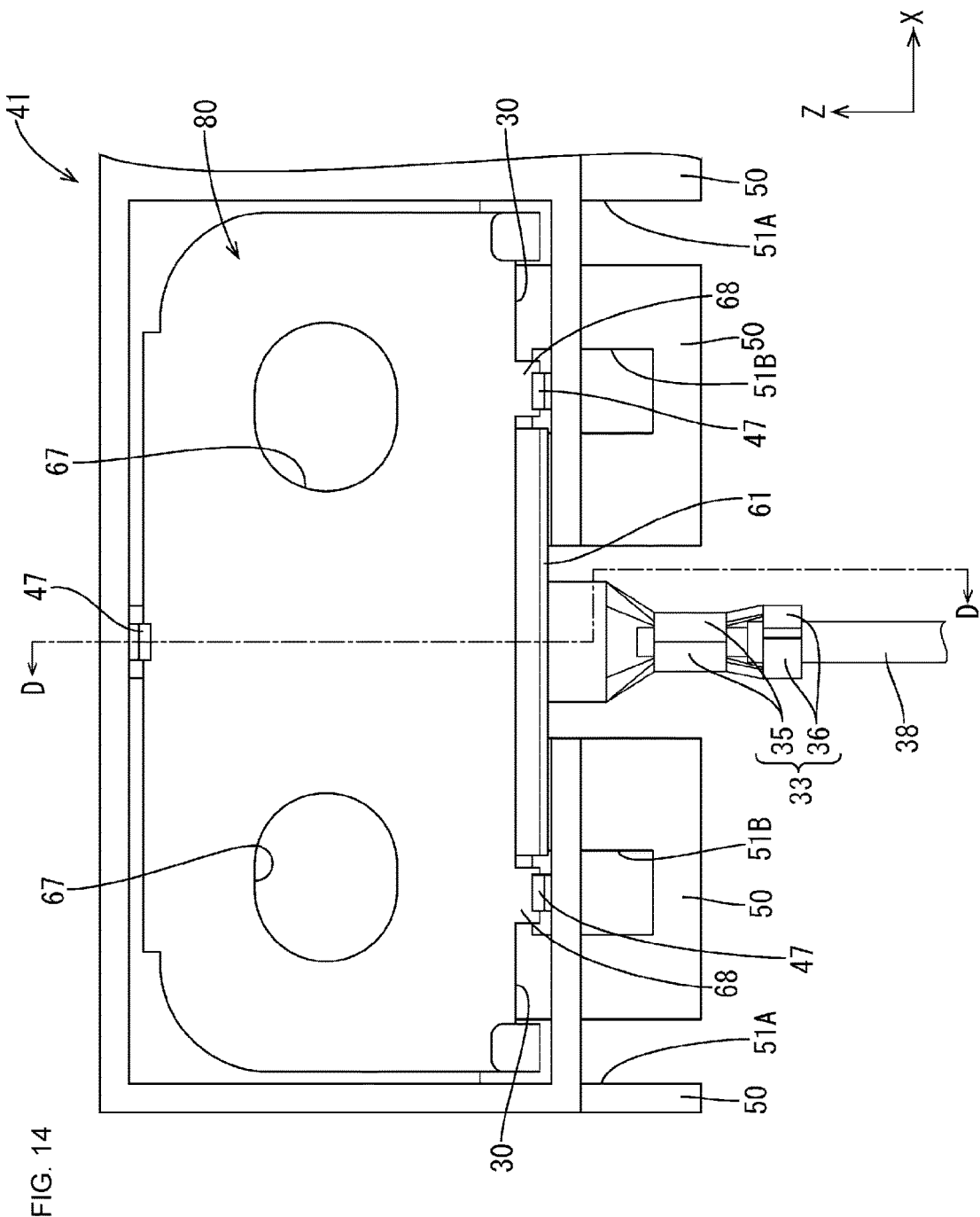
FIG. 14 is a front view of a partial enlargement of a wiring module of a fourth embodiment.
Figure 15:
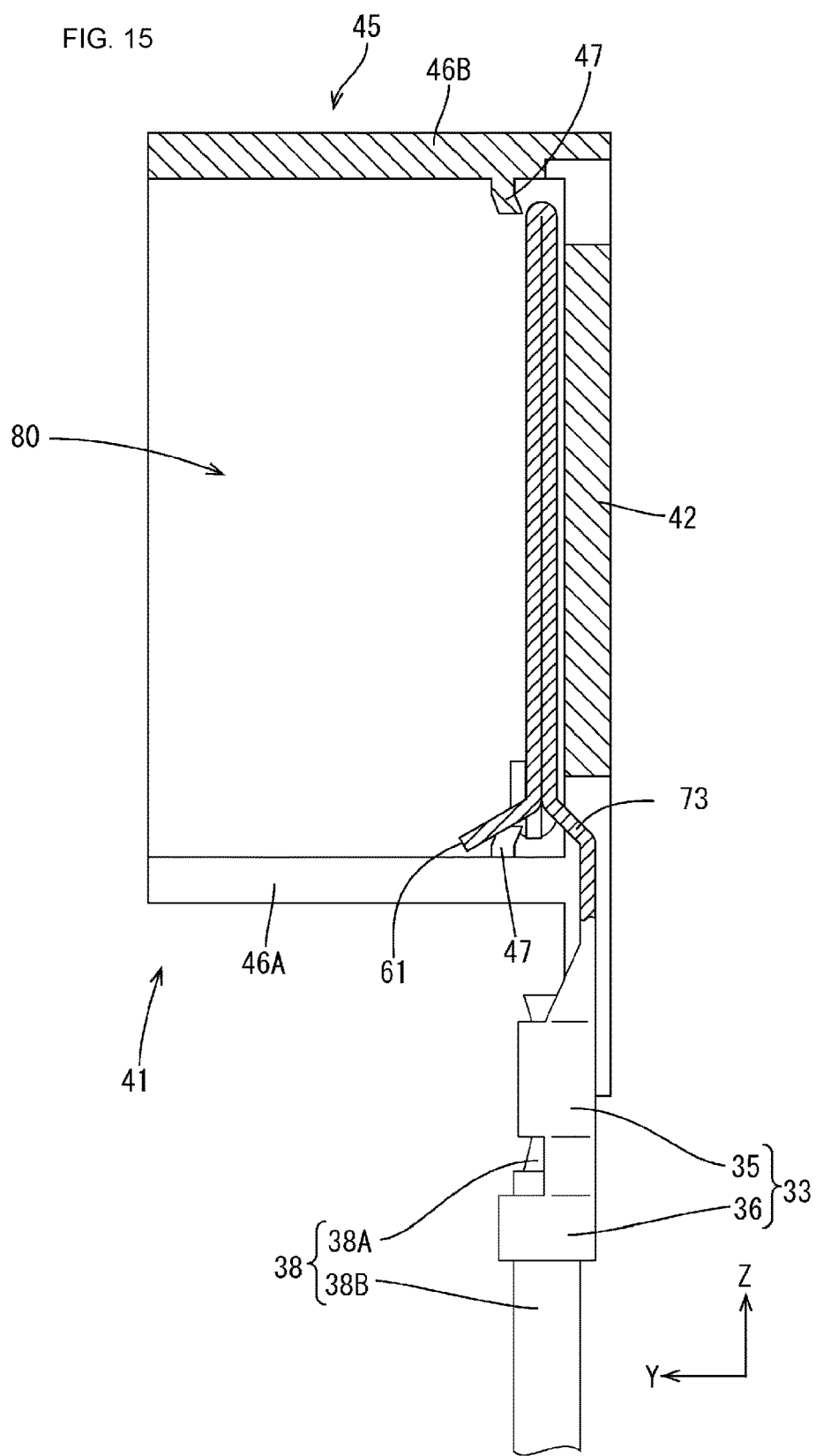
FIG. 15 is a cross-sectional view taken along D-D in FIG. 14.
Figure 16:
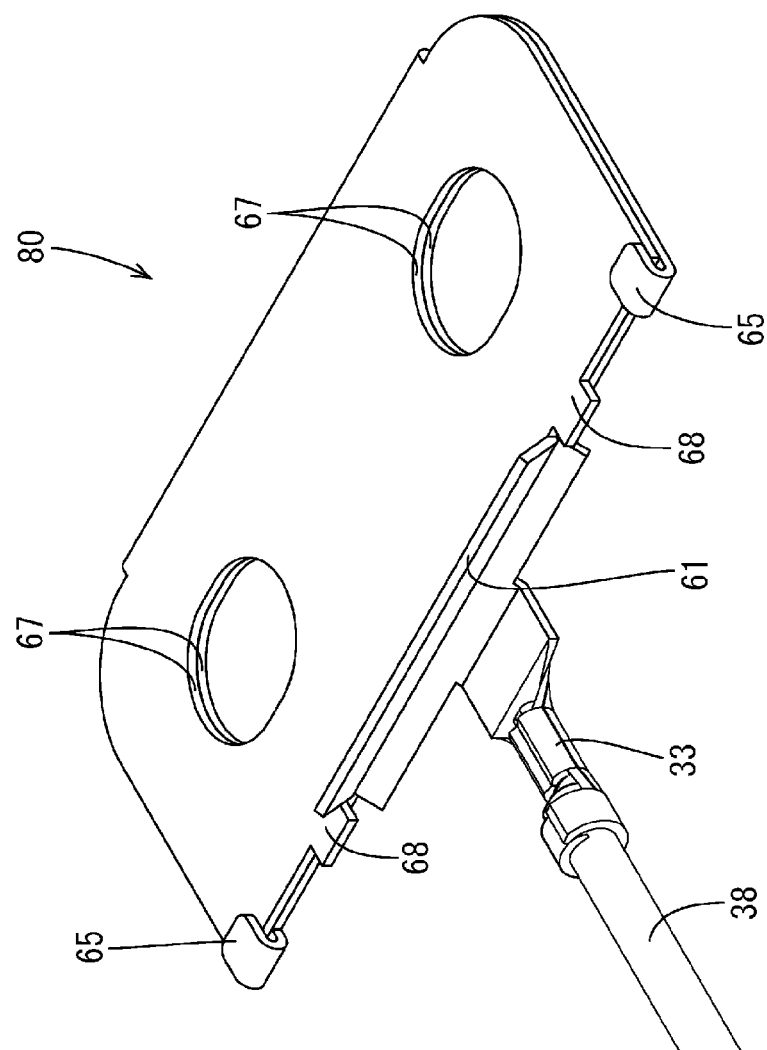
FIG. 16 is a perspective view of a bus bar terminal connected to an end portion of an electrical wire.
Figure 17:
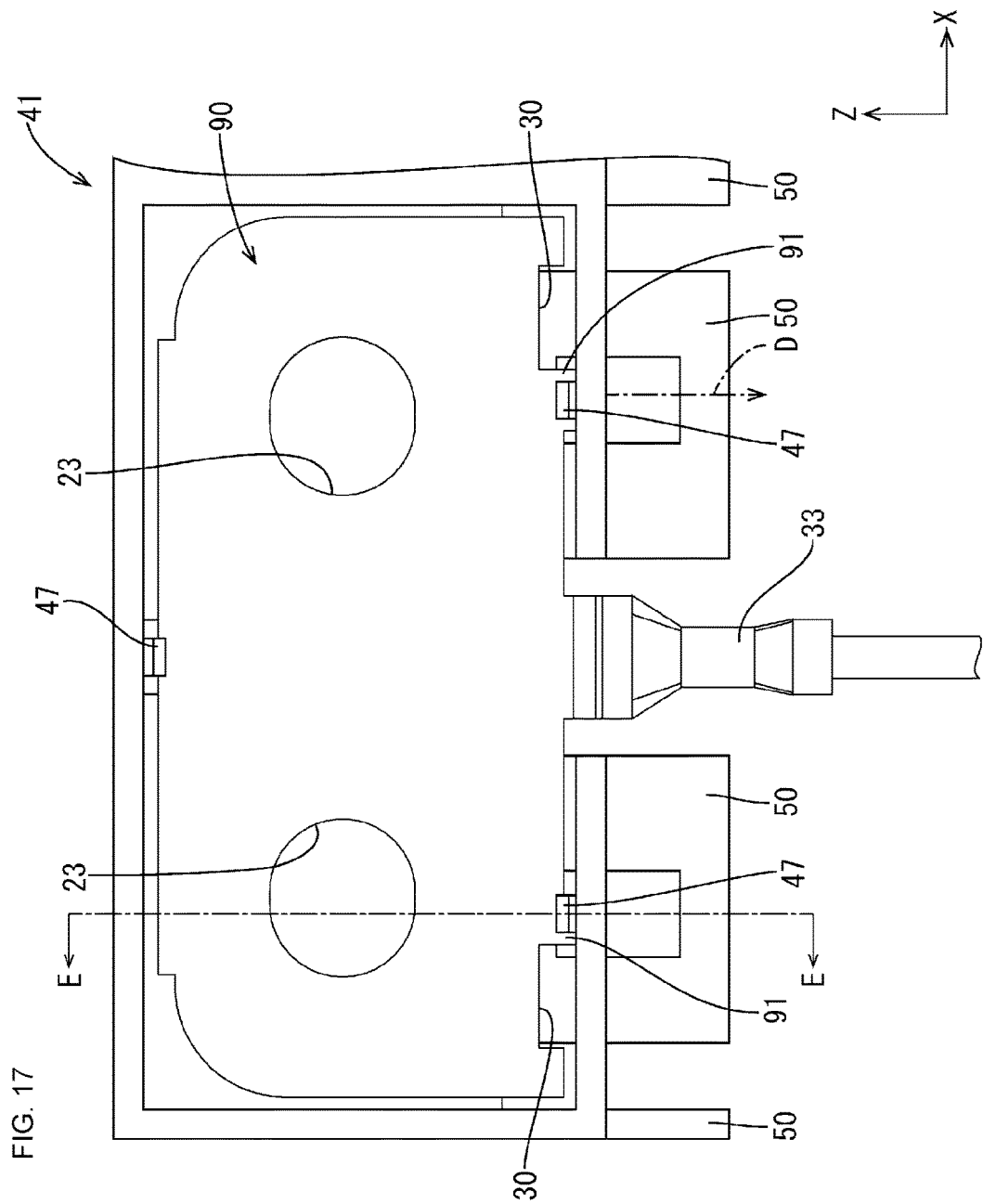
FIG. 17 is a front view of a partial enlargement of a wiring module of a fifth embodiment.

A fourth embodiment will be described below with reference to FIGS. 14 to 16.

In a bus bar terminal 80 of the fourth embodiment, the Z-shaped joining portion of the bus bar terminal 60 of the second embodiment is replaced with a joining portion 73 that has an inclined shape. Configurations that are the same as in the above embodiments are denoted by the same reference signs, thus omitting redundant descriptions.

Fifth Embodiment

A fifth embodiment will be described below with reference to FIGS. 17 to 20.

In a bus bar terminal 90 of the fifth embodiment, the second guide portion 28 is not provided, and third guide portions 91 (one example of a "guide portion") are inserted into the discharge holes 51B. Configurations that are the same as in the above embodiments are denoted by the same reference signs, thus omitting redundant descriptions.

Figure 18:
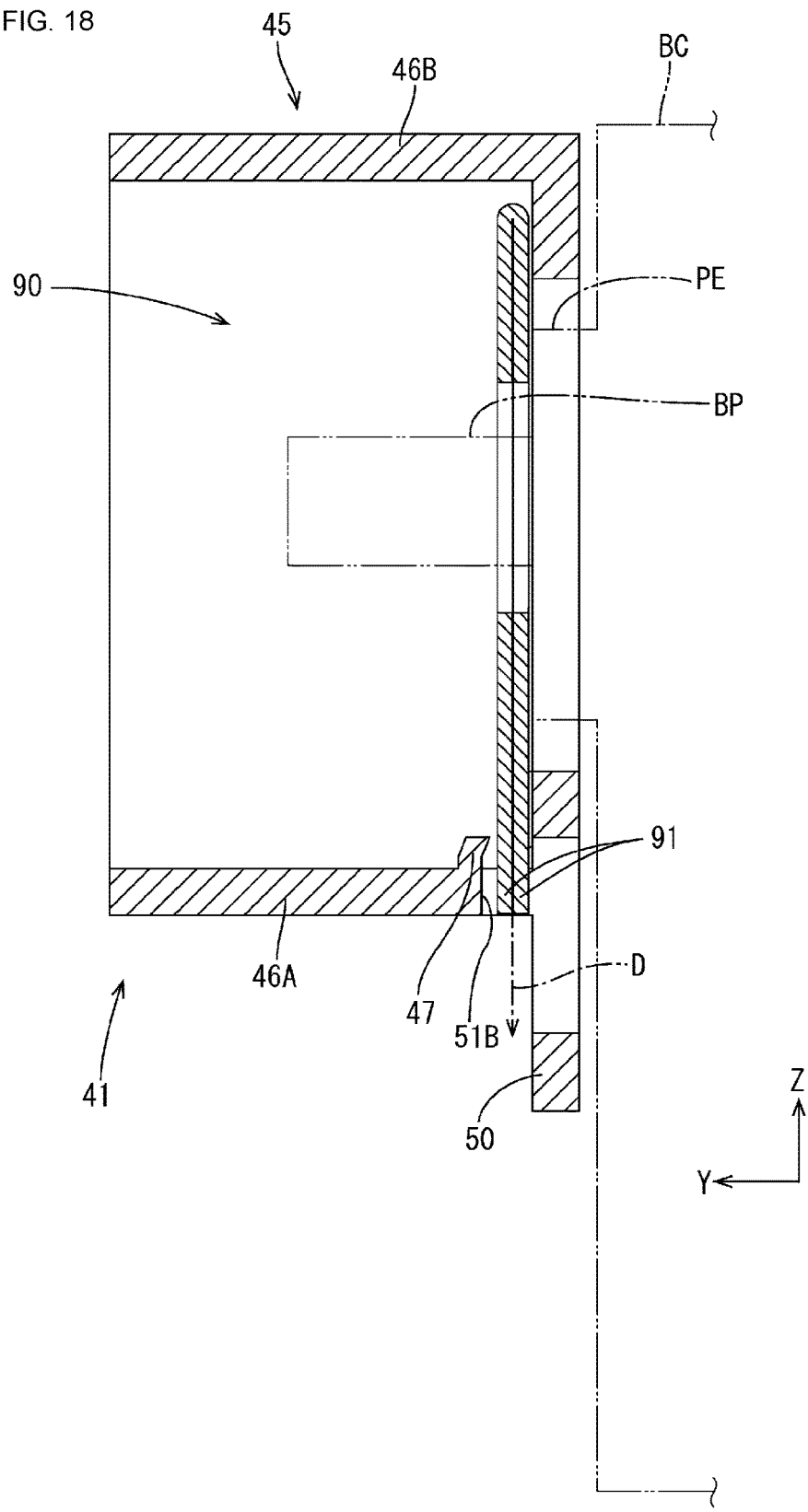
FIG. 18 is a cross-sectional view taken along E-E in FIG. 17.
Figure 19:
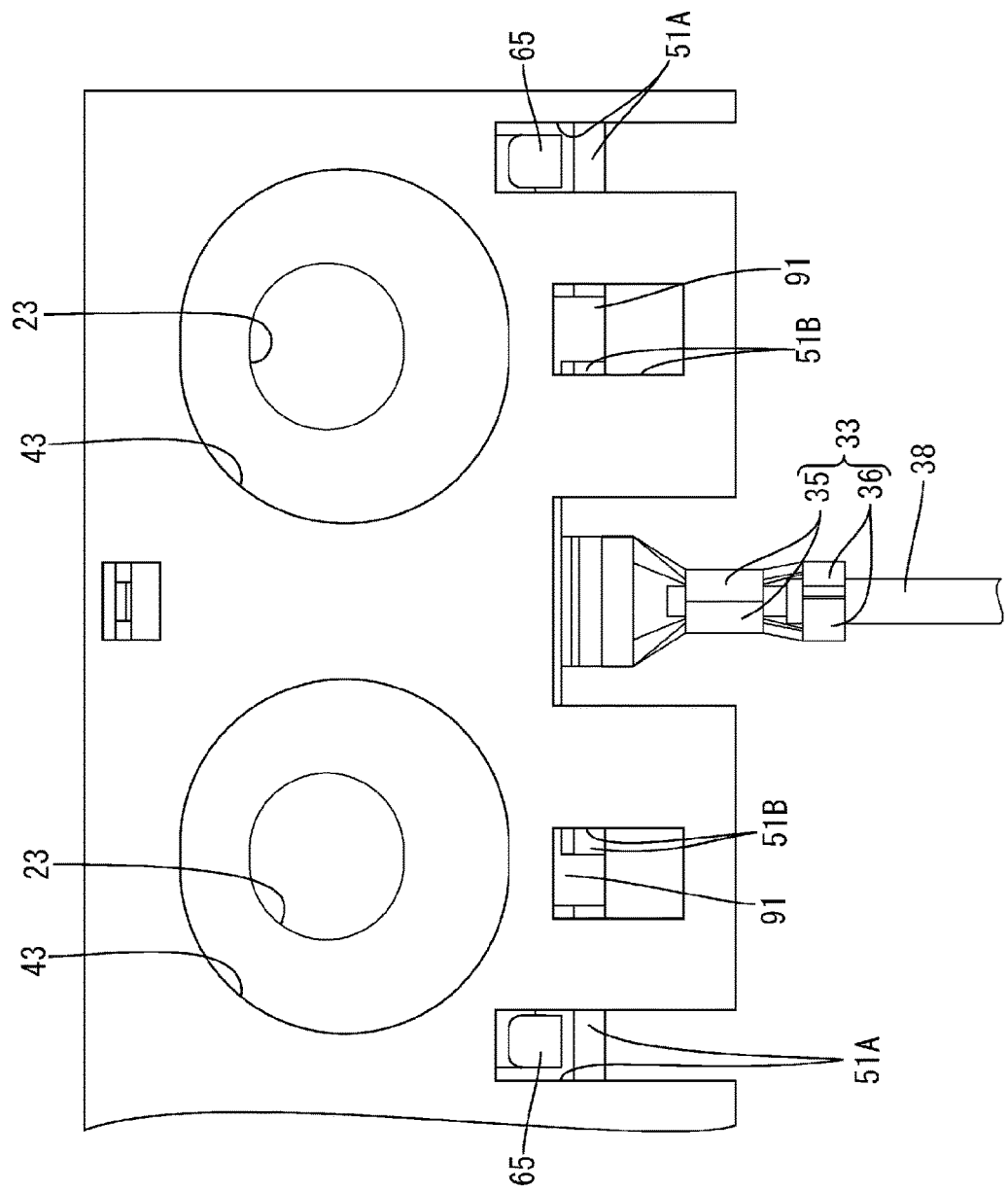
FIG. 19 is a bottom view of a partial enlargement of the wiring module.
Figure 20:
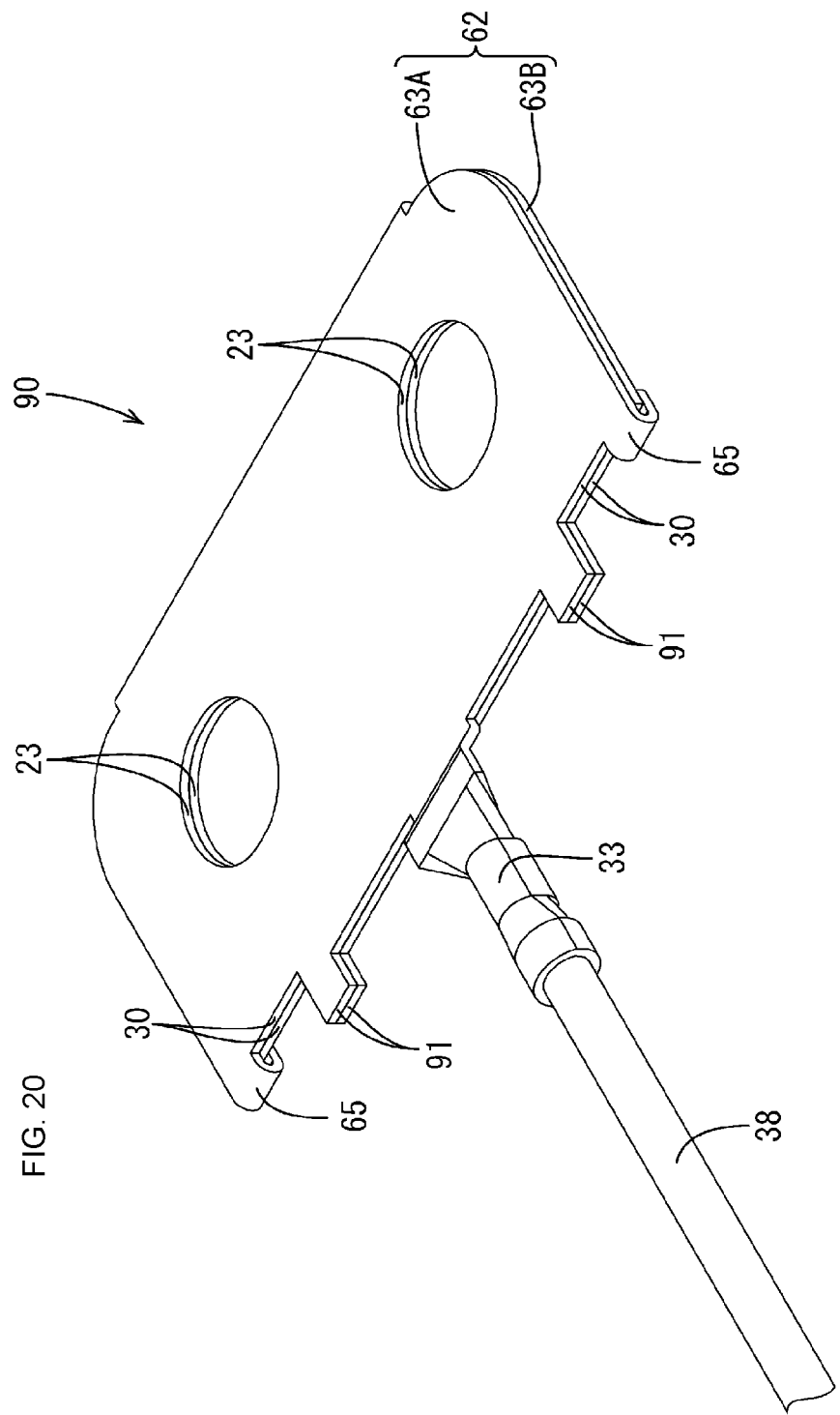
FIG. 20 is a perspective view of a bus bar terminal connected to an end portion of an electrical wire.

The third guide portions 91 are shaped as rectangular plates, and as shown in FIG. 18, extend from the lower end of the plate-shaped portion 21, pass through the discharge holes 51B, and extend to the position of the lower end of the partition wall 46A. These first guide portions 91 not only guide the movement of the liquid D, but also function as locked portions that are locked to the withdrawal restriction pieces 47 so as to restrict withdrawal of the bus bar terminal 90.

When the liquid D that adhered to the electrode connection portion 22 moves to the third guide portions 91 on the lower side and falls downward from the lower ends of the third guide portions 91, the liquid D is then discharged to the outside through the discharge holes 51B.

Sixth Embodiment

Figure 21:
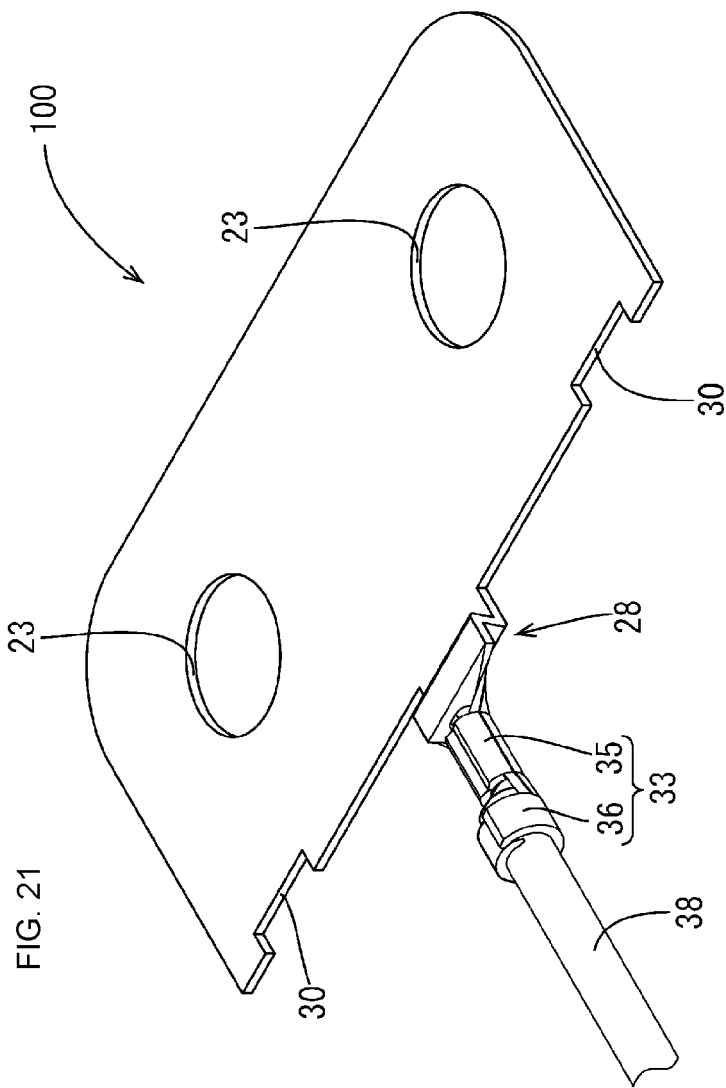
FIG. 21 is a perspective view of a bus bar terminal connected to an end portion of an electrical wire of a sixth embodiment.

A sixth embodiment will be described below with reference to FIGS. 21 and 22.

In a bus bar terminal 100 of the sixth embodiment, the second guide portion 28 is provided, and no first guide portion is provided. Configurations that are the same as in the above embodiments are denoted by the same reference signs, thus omitting redundant descriptions.

Other Embodiments

The present invention is not intended to be limited to the embodiments described using the above descriptions and drawings, and the technical scope of the present invention also encompasses various embodiments such as the following, for example.

Although the bus bar terminals 20 are fastened with the electrode terminals BP and nuts in the above embodiments, there is no limitation to this. For example, fastening may be performed by the shaft portion of a bolt serving as a fastening member being inserted through a nut-shaped electrode terminal. Also, a configuration is possible in which the through-holes 23 are not provided, and connection with the electrode terminals is performed by laser welding, ultrasonic welding, resistance welding, or the like.

Although the power storage elements BC are cells, there is no limitation this, and they may be capacitors or the like.

The insulating protector 40 is not limited to being formed as a single piece. For example, a configuration is possible in which multiple connection units that are made of an insulating synthetic resin are connected on the left and right sides.

The orientation of the wiring module 10 is not limited to the orientation in the above embodiments, and can be arranged in another orientation. For example, the wiring module and the power storage module may be arranged such that the plate surface of the bus bar terminal is oriented in the horizontal direction.

Although the liquid D is water in the above description, it may be a liquid other than water.

Although the second guide portion 28 (guide portion) of the first embodiment extends in a Z-shape, there is no limitation to this. For example, it may extend in an S shape.

Although the bus bar terminal connects adjacent electrode terminals BP, there is no limitation to this, and the terminal may be another terminal. For example, the terminal may be a voltage detection terminal that is connected to an electrode terminal BP. In this case, a configuration is possible in which the terminal is, for example, a voltage detection terminal that is connected to one electrode terminal BP that is not connected to a bus bar for connecting electrode terminals BP to each other (e.g., a electrode terminal BP at an end of serial connection), or a voltage detection terminal that is stacked as a separate body on a bus bar that connects electrode terminals BP to each other.

The invention claimed is:

1. A terminal comprising:
   a connection portion that is to be connected to an electrode terminal of a power storage element; and
   a wire connection portion that is to be connected to an electrical wire,
   wherein a guide portion is disposed entirely between the connection portion and the wire connection portion so as to be spaced apart from the electrical wire, the guide portion guiding a liquid adhered to the connection portion so as to fall to a position separated from the wire connection portion and the electrical wire.

2. The terminal according to claim 1,
   wherein the connection portion is provided in a plate-shaped portion made of a plate-shaped metal member, and
   the guide portion is provided at an end portion on a wire connection portion side of the plate-shaped portion.

3. The terminal according to claim 2, wherein the guide portion is formed as a cutout in an edge of the plate-shaped portion.

4. The terminal according to claim 2, wherein the guide portion extends in a direction that intersects a plate surface of the plate-shaped portion.

5. The terminal according to claim 1, wherein the guide portion joins the connection portion and the wire connection portion with a bent shape having a return portion.

6. The terminal according to claim 1, wherein the connection portion connects a plurality of the electrode terminals to each other.

7. A wiring module comprising:
   the terminal according to claim 1; and
   an insulating protector that houses the terminal,
   wherein the insulating protector comprises a bottom plate portion that opposes a plate surface of the terminal, and a partition wall that rises from the bottom plate portion and partitions off the terminal, and
   a discharge hole is formed in at least one of the bottom plate portion and the partition wall, the liquid that was guided by the guide portion and fell being discharged to the outside by the discharge hole.

8. The terminal according to claim 3, wherein the guide portion extends in a direction that intersects a plate surface of the plate-shaped portion.

9. The terminal according to claim 2, wherein the guide portion joins the connection portion and the wire connection portion with a bent shape having a return portion.

10. The terminal according to claim 3, wherein the guide portion joins the connection portion and the wire connection portion with a bent shape having a return portion.

11. The terminal according to claim 4, wherein the guide portion joins the connection portion and the wire connection portion with a bent shape having a return portion.

12. The terminal according to claim 2, wherein the connection portion connects a plurality of the electrode terminals to each other.

13. The terminal according to claim 3, wherein the connection portion connects a plurality of the electrode terminals to each other.

14. The terminal according to claim 4, wherein the connection portion connects a plurality of the electrode terminals to each other.

15. The terminal according to claim 5, wherein the connection portion connects a plurality of the electrode terminals to each other.

16. A wiring module comprising:
    the terminal according to claim 2; and
    an insulating protector that houses the terminal,
    wherein the insulating protector comprises a bottom plate portion that opposes a plate surface of the terminal, and a partition wall that rises from the bottom plate portion and partitions off the terminal, and
    a discharge hole is formed in at least one of the bottom plate portion and the partition wall, the liquid that was guided by the guide portion and fell being discharged to the outside by the discharge hole.

17. A wiring module comprising:
    the terminal according to claim 3; and
    an insulating protector that houses the terminal,
    wherein the insulating protector comprises a bottom plate portion that opposes a plate surface of the terminal, and a partition wall that rises from the bottom plate portion and partitions off the terminal, and
    a discharge hole is formed in at least one of the bottom plate portion and the partition wall, the liquid that was guided by the guide portion and fell being discharged to the outside by the discharge hole.

18. A wiring module comprising:
    the terminal according to claim 4; and
    an insulating protector that houses the terminal,
    wherein the insulating protector comprises a bottom plate portion that opposes a plate surface of the terminal, and a partition wall that rises from the bottom plate portion and partitions off the terminal, and
    a discharge hole is formed in at least one of the bottom plate portion and the partition wall, the liquid that was guided by the guide portion and fell being discharged to the outside by the discharge hole.

19. A wiring module comprising:
    the terminal according to claim 5; and
    an insulating protector that houses the terminal,
    wherein the insulating protector comprises a bottom plate portion that opposes a plate surface of the terminal, and a partition wall that rises from the bottom plate portion and partitions off the terminal, and a discharge hole is formed in at least one of the bottom plate portion and the partition wall, the liquid that was guided by the guide portion and fell being discharged to the outside by the discharge hole.

20. A wiring module comprising:

the terminal according to claim 6; and an insulating protector that houses the terminal, wherein the insulating protector comprises a bottom plate portion that opposes a plate surface of the terminal, and a partition wall that rises from the bottom plate portion and partitions off the terminal, and a discharge hole is formed in at least one of the bottom plate portion and the partition wall, the liquid that was guided by the guide portion and fell being discharged to the outside by the discharge hole.

* * * * *